(12) United States Patent
Skyberg

(10) Patent No.: US 8,872,898 B2
(45) Date of Patent: Oct. 28, 2014

(54) MOBILE DEVICE CAPTURE AND DISPLAY OF MULTIPLE-ANGLE IMAGERY OF PHYSICAL OBJECTS

(75) Inventor: Rolf Skyberg, Campbell, CA (US)

(73) Assignee: eBay Inc., San Jose, CA (US)

( * ) Notice: Subject to any disclaimer, the term of this patent is extended or adjusted under 35 U.S.C. 154(b) by 364 days.

(21) Appl. No.: 13/325,855

(22) Filed: Dec. 14, 2011

(65) Prior Publication Data

US 2013/0155187 A1    Jun. 20, 2013

(51) Int. Cl.
H04N 13/02    (2006.01)

(52) U.S. Cl.
USPC .................................... 348/46; 348/E13.074

(58) Field of Classification Search
USPC ........................................................... 348/46
See application file for complete search history.

(56) References Cited

U.S. PATENT DOCUMENTS

| 6,762,755 | B2 | 7/2004 | Chen | |
|---|---|---|---|---|
| 2003/0068100 | A1* | 4/2003 | Covell et al. | 382/305 |
| 2007/0057815 | A1* | 3/2007 | Foy et al. | 340/905 |
| 2007/0085913 | A1* | 4/2007 | Ketelaars et al. | 348/239 |
| 2009/0012878 | A1 | 1/2009 | Tedesco et al. | |
| 2009/0070221 | A1 | 3/2009 | Carmichael et al. | |
| 2009/0290013 | A1 | 11/2009 | Hayaski | |
| 2010/0118116 | A1 | 5/2010 | Tomasz et al. | |
| 2010/0149361 | A1* | 6/2010 | Takeuchi | 348/222.1 |
| 2010/0174421 | A1* | 7/2010 | Tsai et al. | 700/302 |
| 2010/0194860 | A1 | 8/2010 | Mentz et al. | |
| 2011/0098056 | A1 | 4/2011 | Rhoads et al. | |
| 2011/0200980 | A1 | 8/2011 | Takahashi et al. | |

FOREIGN PATENT DOCUMENTS

WO    WO-2013090270 A1    6/2013

OTHER PUBLICATIONS

"360 Degree Views", Welcome to 360 Degree Views, http://www.360dereeviews.com/, (Observed Jun. 14, 2011), 3 pages.
"360 Panorama", 360 Panorama—Realtime Panorama Creation, http://occipital.com/360/app, (Observed Jun. 14, 2011), 6 pages.
"Photosynth", Photosynth From Wilipedia, the free encyclopedia, http://en.wikipedia.org/w/index.php?title=Photosynth&printable=yes, (Observed Jun. 14, 2011), 4 pages.
"QuickTime VR", http://en.wikipedia.org/w/index.php?title+QuickTime VR&printable=yes, QuickTime VR—Wikipedia, the free encyclopedia, (Observed Jun. 14, 2011), 3 pages.
"International Application Serial No. PCT/US2012/068959, International Search Report mailed Feb. 15, 2013", 2 pgs.
"International Application Serial No. PCT/US2012/068959, Written Opinion mailed Feb. 15, 2013", 6 pgs.

* cited by examiner

*Primary Examiner* — Thai Tran
*Assistant Examiner* — Nien-Ru Yang
(74) *Attorney, Agent, or Firm* — Schwegman Lundberg & Woesser, P.A.

(57) ABSTRACT

Methods and systems for capturing and displaying multiple-angle imagery of physical objects are presented. With respect to capturing, multiple images of an object are captured from varying angles in response to user input. The images are analyzed to determine whether at least one additional image is desirable to allow generation of a visual presentation of the object. The user is informed to initiate capturing of the at least one more image based on the analysis. The additional image is captured in response to second user input. The presentation is generated based on the multiple images and the additional image. For displaying, a visual presentation of an object is accessed, the presentation having multiple images of the object from varying angles. The presentation is presented to the user of a mobile device according to user movement of the device. The user input determines a presentation speed and order of the images.

17 Claims, 11 Drawing Sheets

MOBILE DEVICE CAPTURE AND DISPLAY OF MULTIPLE-ANGLE IMAGERY OF PHYSICAL OBJECTS

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings that form a part of this document: Copyright 2011, eBay Inc. All Rights Reserved.

TECHNICAL FIELD

This application relates generally to software development and, more specifically, to systems and methods for the capture and viewing of three-dimensional imagery of objects using a mobile or portable device.

BACKGROUND

The Internet has facilitated the ability of millions of computer users to post and view still photographs and video images across essentially unlimited distances for many different purposes, such as retail shopping, second-hand sales, general informational exchange, and the like. Further enhancing this capability is the advent of Internet-connected mobile devices, such as, for example, smart phones, Internet-enabled personal digital assistants (PDAs), and tablet computers, which now allow users to access this visual information without being located at a stationary computer system.

An overwhelming majority of Internet-related imagery employed for shopping, sales, and other activities involves the use of one or more isolated two-dimensional images to provide the user with at least a basic view of a physical item or location of interest. Recently, various parties have begun providing sets of related images that present more realistic views of the item or location of interest by way of images taken from multiple angles relative to the item or location.

For example, some websites provide examples of panoramic views of favorite indoor or outdoor locations. These views are often accomplished by way of "stitching" together multiple photo images taken at various orientations from a stationary location to yield a 360-degree view of the surrounding area. A user viewing such a photograph may then control the current viewing orientation by way of a mouse or a set of directional buttons.

Some websites may provide a set of images of a particular item, such as a product for sale, that provide a view of the item from a variety of angles or vantage points. In some cases, these images are taken using a stationary camera while the object rests on a turntable that is rotated through a series of angles. The photographs may then be presented to the user over the Internet as a series of related images through which the user may scan, again by way of a mouse or a set of directional buttons.

BRIEF DESCRIPTION OF THE DRAWINGS

Some embodiments are illustrated by way of example and not limitation in the figures of the accompanying drawings in which.

DETAILED DESCRIPTION

Figure 1A:
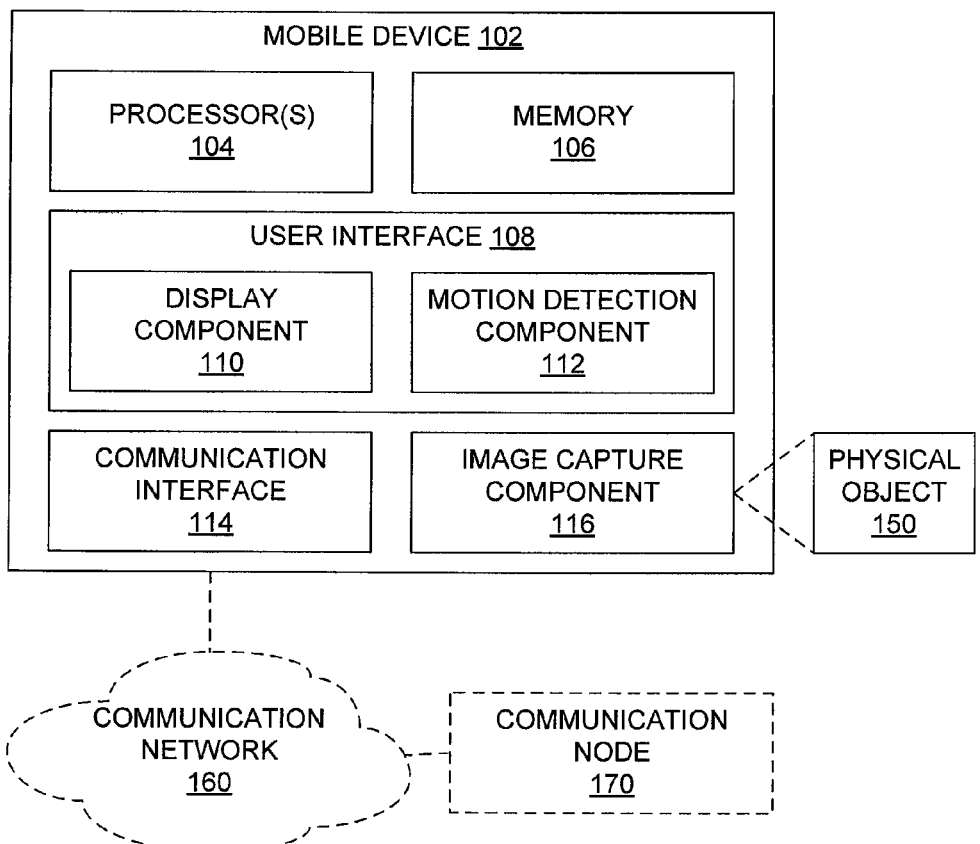
FIG. 1A is a block diagram illustrating an example mobile device.

Example methods and systems for capturing and displaying multiple-angle imagery via a mobile device are presented herein. In the following description, for purposes of explanation, numerous specific details are set forth in order to provide a thorough understanding of example embodiments. It will be evident, however, to one skilled in the art that the present subject matter may be practiced without these specific details. It will also be evident that the types of software development described herein are not limited to the examples provided and may include other scenarios not specifically discussed.

Example Capture and Display Systems and Methods

In accordance with an example embodiment, FIG. 1 illustrates an example mobile device 102 with an image capture component 116 that may allow a user of the mobile device 102 to capture multiple images of a physical object 150 from a variety of angles relative to the object 150 and to generate a multiple-angle visual presentation of the object 150 based on the images. The mobile device 102 may also be configured to present the visual presentation to the user of the mobile device 102 according to inputs provided by the user. The mobile device 102 may be configured to provide either or both of the capture and display functions described in greater detail hereinafter. The physical object 150 may be any physical object, natural or manmade, of any size and shape, of which multiple images, such as a set of single still images, or one or more video clips, may be taken.

In one example, a user may employ the mobile device 102 to capture the multiple images of the physical object 150 through some range of angles about the object, such as, for example, 180 degrees or 360 degrees, via the image capture component 116. The user may then initiate an operation via a user interface 108 of the mobile device 102 to generate a visual presentation of the object 150, which will allow a viewer to peruse the object 150 from any of a number of angles as controlled by the viewer. In one implementation, the user of the mobile device 102 may upload the resulting visual presentation to a communication node 170, such as a network server, via a communication network 160, such as, for example, the Internet or another wide area network (WAN). In one example, the physical object 150 is an object that the user of the mobile device 102 owns and is interested in selling via an online marketplace website, which may be associated with the communication node 170. More specifically, the communication node 170 may make the visual presentation available to other mobile devices for retrieval and viewing for ultimate purchase. Further, the mobile device 102 may retrieve visual presentations provided by other users for perusal by the user of the mobile device 102. In other examples, the physical object 150, as well as the capturing and viewing of visual presentations thereof, may not be associated specifically with an online marketplace website, but may instead be utilized for any other purpose.

In one example, the user of the mobile device 102 may utilize the mobile device 102 to capture images of the physical object 150 from multiple angles, such as by walking 360-degrees around the image and taking a still photo image at every few degrees about the object 150. In another example, the user may capture the multiple images of the object 150 by way of one or more video clips or segments taken as the user walks around the object 150. In another example, the object 150 may be placed on a turntable or similar device and rotated while the user remains stationary and captures the images via the mobile device 102. While capturing the images about the object 150 in such a manner involves a horizontal plane of rotation about the object 150, angles relative to the object 150 other than those describing a horizontal plane may be utilized in other examples.

As shown in FIG. 1A, the example mobile device 102 may include at least one processor 104, memory 106, a user interface 108, a communication interface 114, and an image capture component 116. The processor 104 executes instructions provided by one or more software modules stored in the memory 106, which are described in greater detail below in conjunction with FIG. 1B. The memory 106 may also store other data such as the various images, as well as one or more visual presentations of the physical object 150 and other physical objects.

Generally, the user interface 108 facilitates the reception of input to the mobile device 102 from the user, as well as the outputting of information from the device 102 to the user. As shown in FIG. 1A, the user interface 108 may further include a display component 110 and a motion detection component 112. In embodiments described in greater detail below, the display component 110 may be employed to provide the generated visual presentation of the physical object 150 to the user, to provide feedback to the user regarding the capture of images to be used to generate the visual presentation, and to provide other information. In one example, the motion detection component 112 (such as, for example, an accelerometer, a gyroscope, and/or other motion detection means) detects movement imparted upon the mobile device 102 by the user while the visual presentation is being presented to the user via the display component 110 to control various aspects of the visual presentation, as is described in greater detail below.

The communication interface 114 facilitates communication between the communication node 170 and the mobile device 102 via the communication network 160, as mentioned above. In one example, the communication interface 114 includes an interface for communicating via a cellular phone network, such as a 3G or 4G cellular network coupled with the Internet. In another embodiment, the communication interface 114 may be an IEEE 802.11x (Wi-Fi™) interface capable of communicating with a wireless router coupled with the Internet, such as by way of a DSL (Digital Subscriber Line) or cable gateway. Other types of wired and/or wireless communication interfaces may be employed as the communication interface 114 in other examples.

The image capture component 116 may be any component or system capable of capturing still images and/or video clips or segments of the physical object 150 for use in generating the visual presentation of the object 150. The image capture component 116 may include, in one example, an image array and one or more optical lenses for capturing light from the object 150 used to generate the one or more images.

Figure 1B:
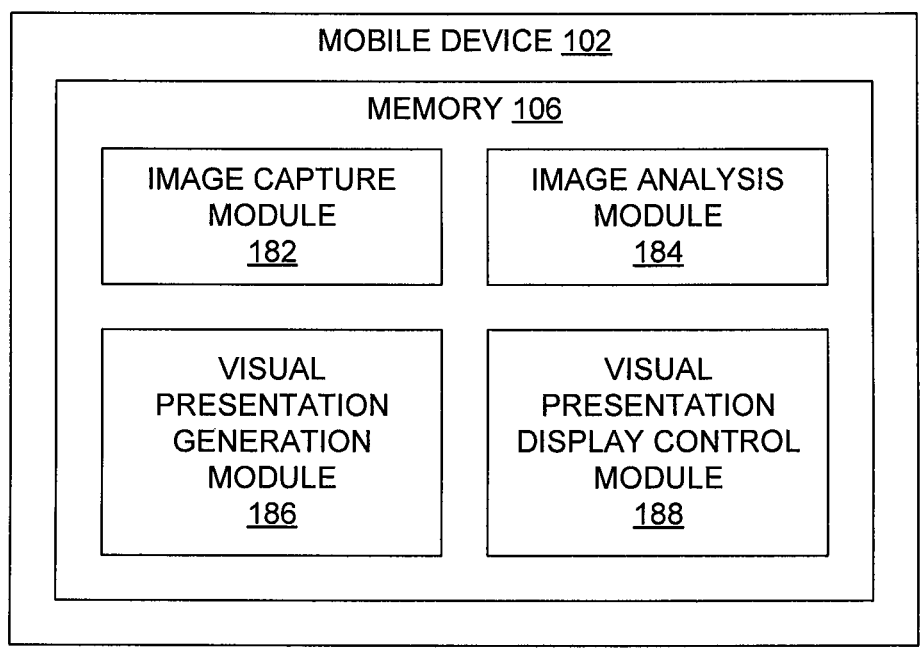
FIG. 1B is a block diagram illustrating example modules of the example mobile device of FIG. 1A.

FIG. 1B is a block diagram of example software modules stored in the memory 106 of the mobile device 102 to be executed by the processor 104. As shown, the modules include an image capture module 182, an image analysis module 184, a visual presentation generation module 186, and a visual presentation display control module 188. In one example, the image capture module 182 may control, or otherwise communicate with, the image capture component 116 to capture the images of the physical object 150 taken at various angles relative to the object 150. The image analysis module 184 may analyze the various images captured via the image capture component 116 and the image capture module 182 to determine if one or more additional images of the object are advantageous to generate a desired visual presentation of the object 150. In addition, the image analysis module 184, via the user interface 108, may provide to the user an indication of one or more angles relative to the object 150 from which the additional images should be captured. The visual presentation generation module 186 may generate the desired visual presentation of the physical object 150 based on the images of the object 150 captured by the mobile device 102. The visual presentation display control module 188 may receive input from the user via the user interface 108 (and, more specifically, via the motion detection component 112) while the visual presentation of the physical object 150 is being presented to the user to control or direct the visual presentation. While the modules of FIG. 1B are described in terms of software modules, the various functions associated with these modules may be implemented in software, hardware, firmware, and/or some combination thereof.

Figure 2:
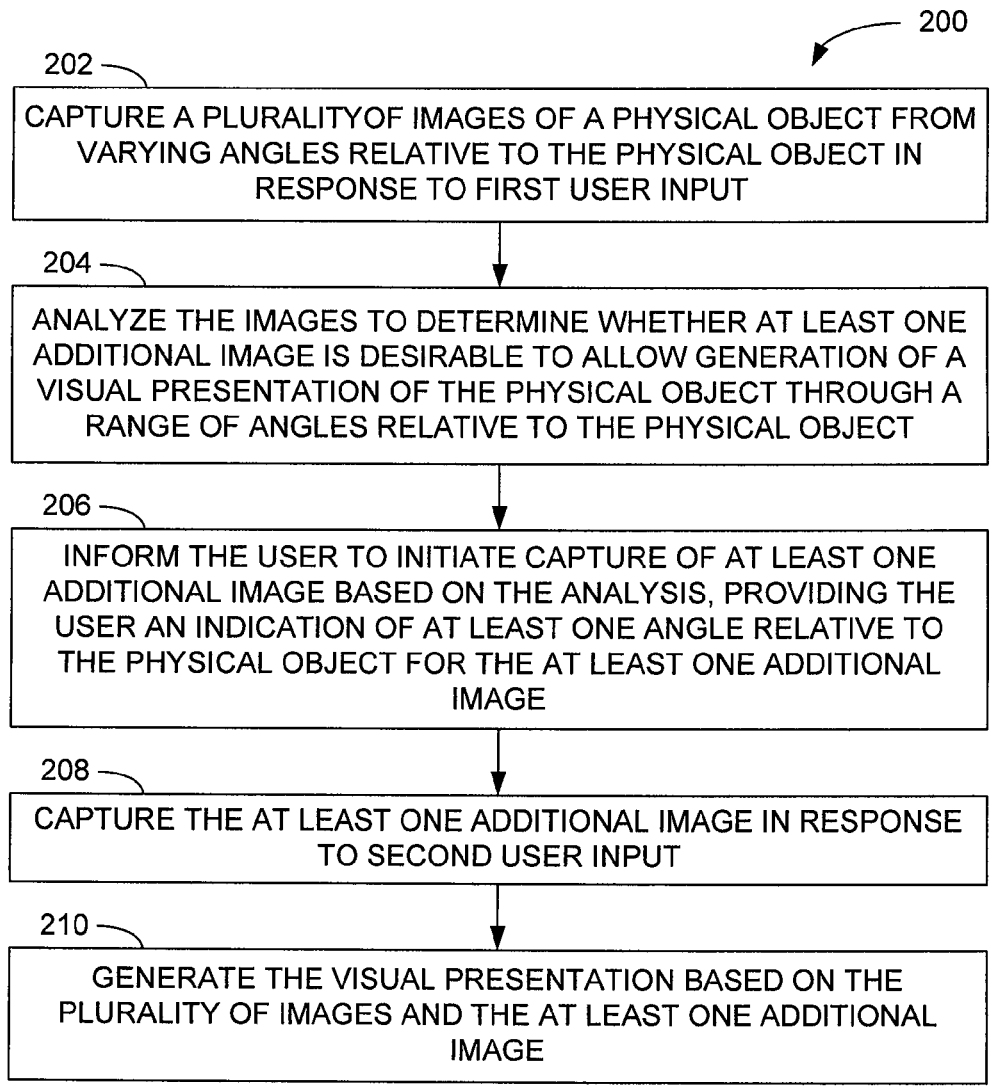
FIG. 2 is a flow diagram of an example method of capturing images of a physical object to generate a visual presentation of the object.

FIG. 2 illustrates a flow diagram of an example method 200 for capturing multiple images of the physical object 150 at various angles relative to the object 150. While the mobile device 102 of FIG. 1A may be employed to execute the method 200, other mobile devices utilizing different components or systems, or any other computing or electronic device, may execute the various operations of the method 200 depicted in FIG. 2 in other examples. In the method 200, a plurality of images of the physical object 150 are captured from varying angles relative to the object 150 in response to first user input (operation 202). The images are analyzed to determine whether at least one additional image is desirable to allow generation of a visual presentation of the physical object 150 through a range of angles relative to the object 150 (operation 204). The user is informed to initiate capture of at least one additional image based on the analysis, with the user being provided an indication of at least one angle relative to the physical object 150 for the at least one additional image (operation 206). The at least one additional image of the object 150 is then captured in response to second user input (operation 208). The visual presentation is generated based on the plurality of images and the at least one additional image (operation 210).

In another example, the method 200 may be encoded as instructions on a non-transitory computer-readable storage medium, such as, for example, an integrated circuit, magnetic disk, or optical disk, which are readable and executable by one or more electronic processors.

Figure 3:
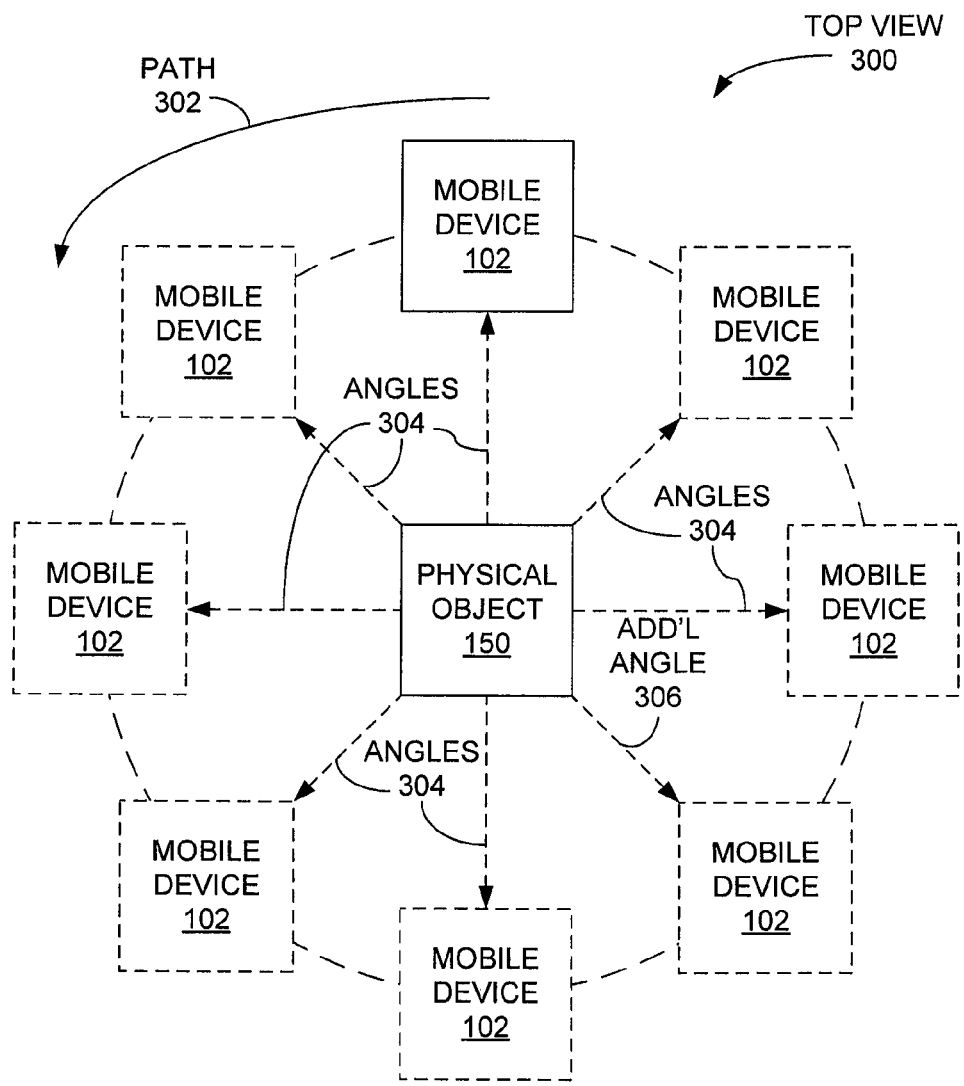
FIG. 3 is a top view of an example of capturing images of a physical object using the example mobile device of FIG. 1A.

FIG. 3 depicts a top view 300 of an example mobile device 102 in relation to the physical object 150 of which a multiple-angle visual presentation is to be generated. In this example, a user captures images of the physical object 150 from multiple angles 304 using the mobile device 102 while following a path 302 about the object 150. As shown, the user may capture single images by initiating a still photo image mode of the mobile device 102 for each image, although the user may instead employ a video clip capture mode of the mobile device 102 in other embodiments, likely resulting in many more images being captured as the user follows the path 302 about the physical object 150. In one example, the mobile device 102 may receive a command from the user to initiate a multiple-image capture mode, in response to which the mobile device 102 may initiate a video capture mode that ceases upon user direction. In another example, initiation of a still photo image mode may cause the mobile device 102 to capture a still photo image once per some unit of time, such as one second, until the user terminates the image capture function.

After capturing the images of the physical object 150, the mobile device 102 may analyze the images of the object 150 to determine whether any additional images of the physical object 150 should be captured, such as to improve the quality of the visual presentation to be generated. In some embodiments, the mobile device 102 may determine whether at least one additional image at or around an additional angle 306 should be captured. For example, no images may have been captured of the object 150 at or near the additional angle 306, thus resulting in a "gap" in the overall image coverage of the object 150 from multiple angles. In another example, one or more images may have been captured at or near the additional angle 306, but the quality of those images may be poor (for example, inadequate lighting, overexposure, and/or so on) compared to the images taken at the other angles 304.

In response to such an analysis, the mobile device 102 may request the user to capture at least one additional image of the object 150 at or near the additional angle 306. In addition, the mobile device 102 may indicate the additional angle 306 relative to the object 150 at which the one or more images are to be captured. In one example, the mobile device 102 may present the images that were captured at angles 304 adjacent to the additional angle 306, and indicate to the user that the additional images should be taken at angles 306 between those indicated in the presented images. Other methods by which the mobile device 102 may indicate the additional angle 306 to the user may be utilized in other implementations, such as by way of Global Positioning System (GPS) data. In other examples, the mobile device 102 may also provide guidance as to how the at least one additional image is to be captured, such as for example, by suggesting photographic flash settings, aperture or capture speed settings, zoom settings, and/or other settings related to the capturing of the at least one additional image.

In response to the request, the user may then cause the mobile device 102 to capture the image at the requested additional angle 306. In response to the at least one additional image being captured, the mobile device 102 may analyze the previously captured images, along with any additional captured images, and determine if any more images should be captured. If so, the mobile device 102 may then request more images be taken at one or more angles relative to the object 150. Otherwise, the mobile device 102 may then proceed to generate the visual presentation of the object 150 based on the captured images.

Figure 4:
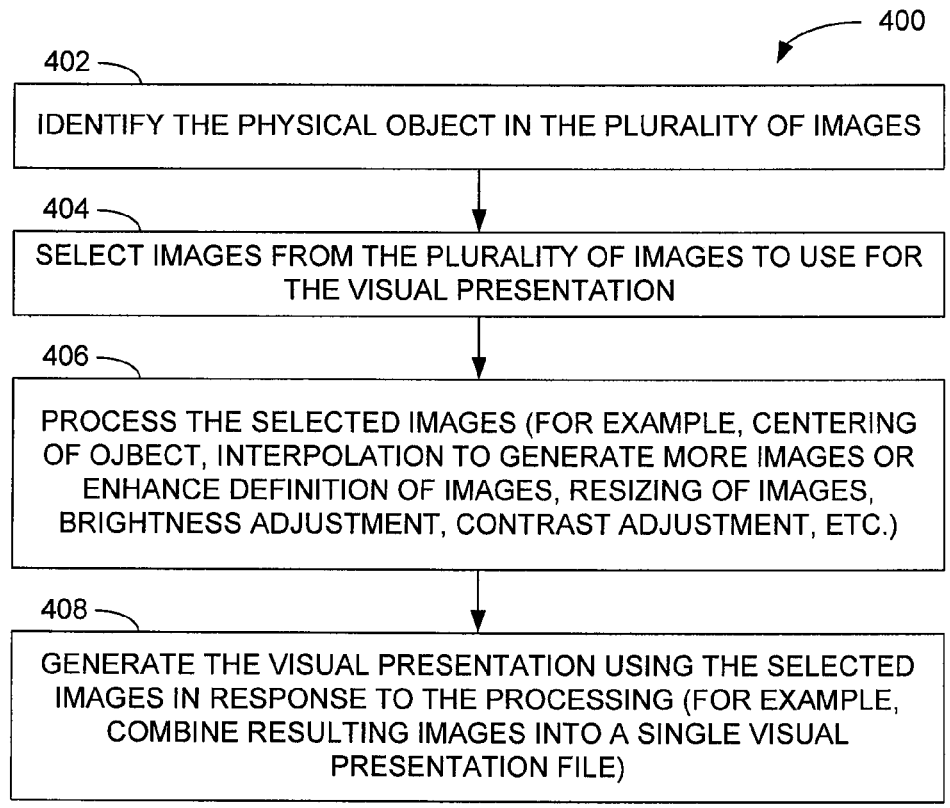
FIG. 4 is a flow diagram of an example method of generating a visual presentation of a physical object from a plurality of images of the object.
Figure 5:
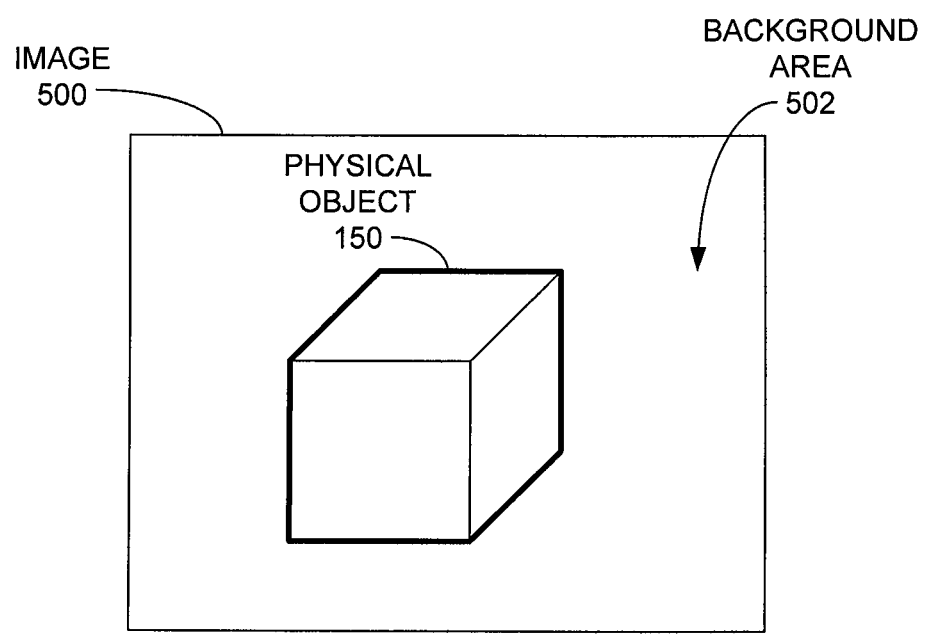
FIG. 5 is an example image of a physical object exemplifying detection of the object in the image.

FIG. 4 is a flow diagram of an example method 400 for generating a visual presentation from a plurality of captured images of the physical object 150. In the method 400, the physical object 150 may be identified in each of the plurality of captured images of the physical object 150 (operation 402). FIG. 5 provides an example of an image 500 of the physical object 150, which, in this case, is a cubic object. The remaining area of the image is labeled in FIG. 5 as background area 502. By identifying the portion of the image representing the object 150 of interest, the mobile device 102 may process each image to provide an acceptable visual presentation of the object 150, as described in greater detail below.

Also in the method 400, at least some of the plurality of images may be selected as a basis for the visual presentation (operation 404). For example, less than all of the images may be selected for inclusion in the visual presentation in cases in which some of the images are of poor or unacceptable quality. In another example, at least some of the images may be somewhat duplicative of other images, thus allowing the duplicative images to be ignored, or remain unselected, when generating the visual presentation. A video clip of the object 150 may include groups of images which are nearly identical. As a result, less than all of these images may be included in the visual presentation in order to simplify and reduce the overall size of the visual presentation.

At least some of the remaining selected images may then be processed at the mobile device 102 (operation 406) to render the images more suitable for inclusion in the visual presentation. In one example, additional images may be interpolated from existing selected images to provide a smoother, or more seamless, visual presentation. For example, two images taken in close proximity in terms of the relative angle to the object 150 may be combined to form a third virtual image representing a relative angle between those angles associated with the two original images.

In another example, interpolation may be employed within one or more images to enhance the resolution of each image as provided in the visual presentation of the object 150. In yet other implementations, the resolution of one or more images may be reduced to facilitate viewing of the visual presentation on a relatively low-resolution display device.

FIG. 5 is a graphical representation of an image 500 of the plurality of images to be incorporated into the visual presentation of the physical object 150. To prevent undue relative movement of the physical object 150 as represented within the image 500, the image 500 may be processed to detect the physical object 150 (denoted by the darkened outline in FIG. 5). Such detection may involve, for example, line detection within each image 500, comparison of one image 500 with another, and other techniques employable to detect the object 150. In some examples, the mobile device 102 may request input from the user of the mobile device 102 to identify the boundaries of the physical object 150 within one or more of the images 500.

By detecting the physical object 150 within each image 500, other processing may occur to enhance the visual presentation to be generated. For example, one or more of the images 500 may be processed to center the physical object 150 within the image 500. If most or all of the images 500 to be incorporated in the visual presentation are processed in such a manner, the physical object 150 will appear to remain stationary from image 500 to image 500 of the visual presentation, thus enhancing the viewing experience.

In some examples, one or more of the images 500 may be processed so that the size of the physical object 150 may be rendered consistent from image 500 to image 500. In one implementation, the mobile device 102 may "zoom in" and/or "zoom out" on each of the images 500 so that the overall apparent size of the physical object 150 may appear to remain constant while a user views the resulting visual presentation. This processing may include, for example, rescaling of the image 500, either up or down in resolution, to effect a corresponding change in the apparent size of the physical object 150 within each image 500.

In at least some cases, centering and/or resizing of the physical object 150 within one or more images 500 may result in the captured portion of the image 500 occupying less than all of the viewable image area available to the user of the mobile device 102. To address this issue, the mobile device 102 may replace one or more portions of the background area 502 of the image 500 (see FIG. 5) with other visual information, such as a solid color or some visual pattern. In some examples, the entirety of the background area 502 may be replaced in such a manner to enhance or emphasize the physical object 150 within the image 500. In one instance, at least part of the background area 502 may be replaced with a generated or created "shadow" for the object 150 to provide the image 500 with some implied depth.

In other examples, instead of replacing the background area 502, the mobile device 102 may deemphasize the background area 502 of the image 500 by any number of techniques, such as, for example, converting the background area 502 from color to black-and-white, blurring or defocusing the background area 502, and/or reducing the brightness or contrast of the background area 502.

To further enhance the viewing quality of the visual presentation, the mobile device 102 may correct or adjust other aspects of the physical object 150 and/or the background area 502 of at least some of the incorporated images 500. These aspects may include, in some examples, brightness, contrast, color, hue, and the like of the physical object 150, the background area 502, or both.

While several different forms of processing of the images 500 in generating the visual presentation are discussed above, other types of processing, either in addition to, or in substitution of, those forms of processing explicitly described herein, may be employed in other embodiments. In another example, any of the identification operation 402, the selection operation 404, and the processing operation 406 of FIG. 4 may be employed to determine whether the user should capture additional images for the presentation, as described above in reference to the method 200 of FIG. 2.

Figure 6:
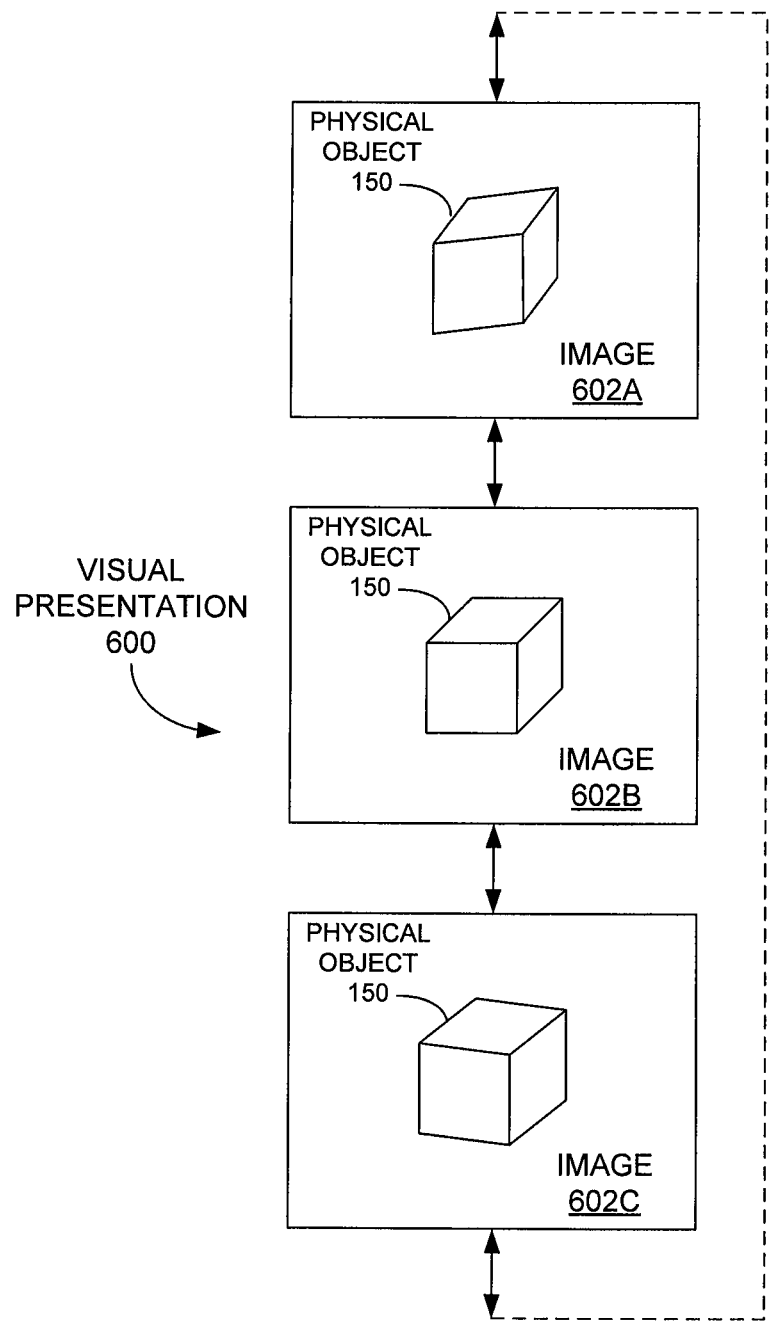
FIG. 6 is an example visual presentation of a physical object, wherein the visual presentation includes multiple images.

Returning to the method 400 of FIG. 4, the visual presentation of the physical object 150 may then be generated using the processed images 500 (operation 408). In one example, the various images 500 may be linked together, or combined, in a single file, or in a collection of files. The user of the mobile device 102 or another computing system would be able to access and control the display of the visual presentation. FIG. 6 provides a graphical example of a visual presentation 600, in which multiple images 602A, 602B, 602C (collectively, 602) are linked together in a predetermined order so that the user may traverse the images 602 as directed in the visual presentation 600. In the example of FIG. 6, the images 602 are linked in a linear fashion so that the user may progress from one adjacent image 602 to another according to their angular position relative to the physical object 150. In one implementation, the images 602 may be linked in a circular arrangement, such as if the images 602 collectively describe a 360-degree view of the physical object 150. While the example visual presentation 600 of FIG. 6 provides a view of the physical object 150 from multiple angles lying in a horizontal plane in which the object 150 is located, in other embodiments, one or more planes of angles, including one or more vertical and/or horizontal planes in which the physical object 150 lies, may be represented by the images 602 of the visual presentation 600. In such an implementation, the various images 602 may be linked in a multi-dimensional array or similar data structure so that progressing through the images 602 in both vertical and horizontal directions relative to the object 150 may be possible.

In addition, the user of the mobile device 102 or other computing device employed to view the visual presentation 600 may also be configured to receive input from the user to zoom in and/or out of one or more images 602 of the visual presentation to enhance the viewing of the physical object 150. In one example, a single image 602 may be employed for each angle relative to the object 150, with the zooming function being applied to that single image 602. In another implementation, at least two images 602 may have been captured and processed for each angle relative to the object 150, in which case zooming in or out at a particular angle may involve displaying a particular one of the images 602 associated with a selected zoom level. In other examples, a combination of image selection and zooming in and out within the selected image 602 may be utilized.

In addition to the actual images 602, the visual presentation 600 may also include various metadata, including, but not limited to, linking information that couples the various images 602 together in a predetermined arrangement, information describing the range of angles about the object 150 represented in the visual presentation 600, information describing the range of zooming available, and information describing the physical object 150.

While the majority of the image processing and other aspects of generating the visual presentation 600 are described above as occurring in the mobile device 102, at least some of these aspects may be accomplished in another electronic system. In one example, the mobile device 102 may communicate with the communication node 170 via the communication network 160 (FIG. 1A) in any manner to allow the communication node 170 to perform at least some of the image processing and/or other aspects of generating the presentation 600. In doing so, such processing may be performed more quickly, and with less computational burden on the mobile device 102.

After the visual presentation 600 of the physical object 150 is generated, the visual presentation 600 may be viewed by way of the mobile device 102, another mobile device not specifically described herein, or any other computing or electronic device capable of displaying the visual presentation to a user. In the examples to follow, the mobile device 102 of FIG. 1A is employed to display the visual presentation 600 under the control of the user, primarily via translational and/or tilting (or rotational) movement of the device 102 by the user.

Figure 7:
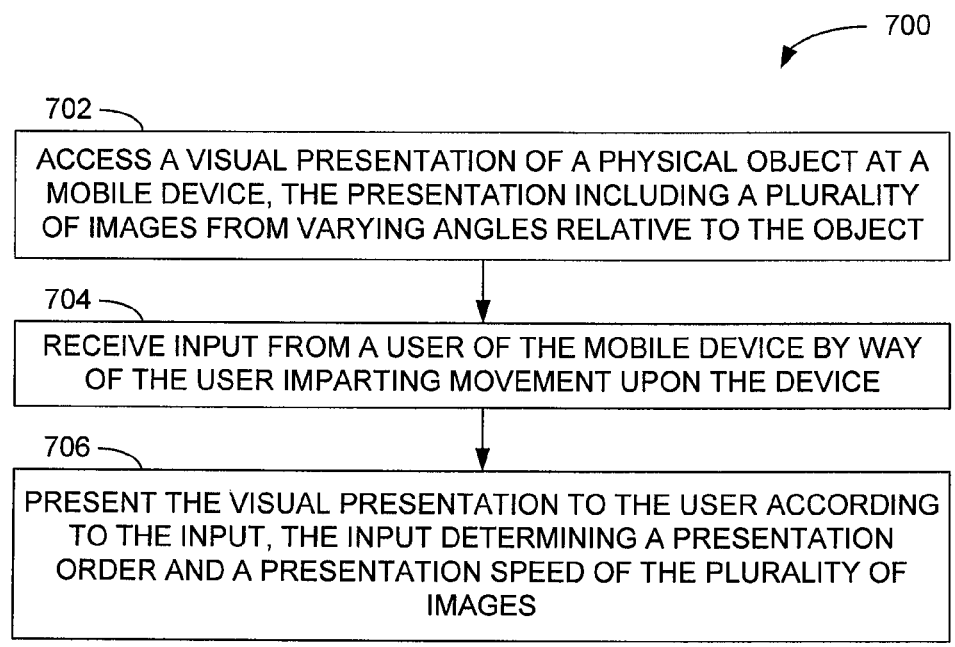
FIG. 7 is a flow diagram of an example method of displaying a visual presentation of an object, wherein the displaying is under the control of the user.

FIG. 7 is a flow diagram of an example method 700 of presenting a visual presentation (such as, for example, the visual presentation 600 of FIG. 6). In the method 700, a visual presentation of a physical object (such as the physical object 150 of FIG. 1A) is accessed at a mobile device (such as the mobile device 102 of FIG. 1A (operation 702). In some examples, the visual presentation may be pre-stored in at least one memory of the mobile device 102, or may be accessed from another device, such as the communication node 170 of FIG. 1A. As discussed above, the visual presentation may include a plurality of images captured from varying angles relative to the physical object 150. Input is received from a user of the mobile device 102 by way of the user moving (for example, translating and/or tilting) the mobile device 102 (operation 704). The visual presentation is presented to the user according to the user input, wherein the input determines a presentation order and a presentation speed of the plurality of images (operation 706). While the method 700 is presented in FIG. 7 as a series of discrete operations performed in a particular order, at least the receiving operation 704 and the presenting operation 706 may occur concurrently, such that the mobile device 102 continues to provide the visual presentation in reaction to various physical movements imparted by the user on the mobile device 102.

Figure 8A:
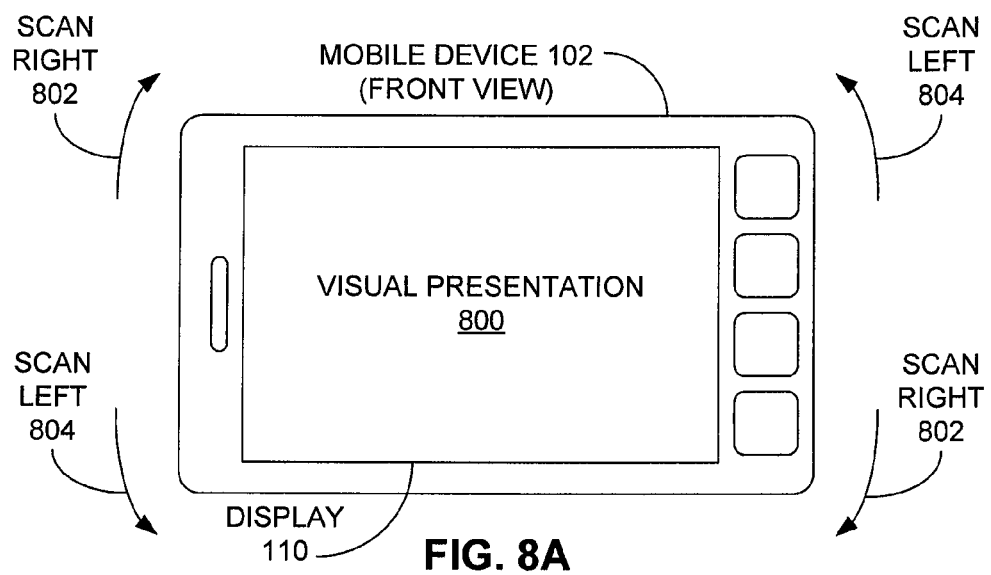
FIG. 8A is a graphical representation of example user control of scanning through multiple images of a visual presentation of an object via tilting.
Figure 8B:
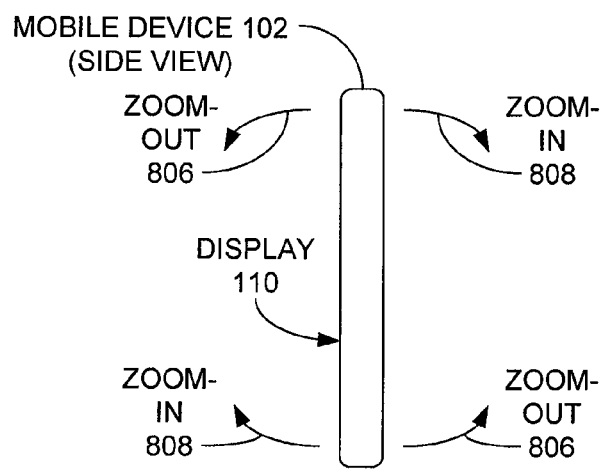
FIG. 8B is a graphical representation of example user control of altering a zoom level of an image of a visual presentation of an object via tilting.

FIGS. 8A and 8B provide a front view and a side view, respectively, of the mobile device 102 indicating how the mobile device 102 may be tilted or rotated in various directions in order to control the visual presentation 800 on the display 110 of the device 102. As shown in FIG. 8A, the mobile device 102 may be tilted clockwise in order to effect a scan right operation 802 of the visual presentation 800. More specifically, as the mobile device 102 is tilted clockwise from the perspective of the user, the visual presentation 800 displayed to the user may progress through the associated images to the right relative to the physical object 150, such as progressing from image 602A through image 602B to image 602C (FIG. 6). According to this example, the mobile device 102 may also be tilted counterclockwise to cause the mobile device 102 to engage in a scan left operation 804 for the visual presentation 800. As a result, as the mobile device 102 is tilted counterclockwise from the perspective of the user, the images of the visual presentation 800 displayed to the user may progress to the left relative to the physical object 150, such as progressing from image 602C through image 602B to image 602A (FIG. 6).

In one embodiment, the amount of tilt or rotation applied to the mobile device 102 may determine the speed at which the images in the visual presentation 800 are scanned through when displayed to the user. For example, the more extreme the tilt of the mobile device 102 from a nominally horizontal position, the faster the individual images of the visual presentation 800 are displayed in succession via the display 110 to the user. Accordingly, maintaining the mobile device 102 in an essentially horizontal position (as shown in FIG. 8A) may cause the visual presentation 800 to provide a constant or near-constant display of an image of the presentation 800 associated with a particular angle relative to the physical object 150.

In an alternative example, the user may rotate the mobile device 102 about a vertical axis (in other words, a "yaw" rotation) to cause the visual presentation 800 to scan through the images to the left or right, depending on the direction of rotation the user imposes on the mobile device 102.

In the example of FIG. 8B, the mobile device 102 may be tilted forward or backward from the perspective of the user to cause the device 102 to present a zoomed-in or zoomed-out version of the presentation image currently being displayed to the user. More specifically, tilting the top of the mobile device 102 away from the user (or, similarly, tilting the bottom of the device 102 toward the user) may cause the device 102 to perform a zoom-in operation 808 on the current image being presented on the display 110. Oppositely, tilting the bottom of the mobile device 102 away from the user (or, correspondingly, tilting the top of the device 102 toward the user) may cause the device 102 to perform a zoom-out operation 806 on the current image. Similar to scanning from image to image, as described above, the speed at which the mobile device 102 zooms in or out of the current image may be associated with the magnitude of the tilt of the device 102, forward or backward. Maintaining the mobile device 102 in a vertical orientation (as viewed from the side of the device 102) may thus maintain the visual presentation 800 at the current zoom level of the image currently being presented via the display 110.

In addition, tilting of the mobile device 102 to the left or right, as shown in FIG. 8A, may then cause the device 102 to progress through the images of the visual presentation 800 in the corresponding direction at the same zoom level for each of the images being displayed. For example, if the current image of the presentation 800 is being shown at the most zoomed-in level, tilting the device 102 to the left may cause the device 102 to scan through the images to the left relative to the object 150, all at the same zoomed-in level.

In the preceding example, as well as any of the examples discussed more fully below, tilting or rotating the mobile device 102 in two or more different ways simultaneously (such as, for example, tilting the device 102 both forward and to the left at the same time) may cause the operations associated with each of these directions to be performed concurrently (such as scanning left in the visual presentation 800 while increasing the zoom-in level of the images).

In visual presentations 800 that include images that are captured from both horizontal and vertical angles relative to the physical object 150 so that upper and lower views of the object 150 may be seen, tilting of the mobile device 102 in a forward and/or backward direction (as shown in FIG. 8B) may cause the device 102 to scan through the images associated with the upper and lower views of the object 150 instead of altering the zoom level of an image. For example, when the user tilts the mobile device 102 forward, the mobile device 102 may scan through images that progress from a view associated with a side view of the object 150 toward a view associated with a top view of the object 150. Similar to the examples described above, the greater the magnitude of the forward or backward tilt, the faster the scanning through the images associated with the higher or lower views of the object 150. Furthermore, tilting the mobile device 102 both left or right and forward or backward simultaneously may cause the device 102 to progress through the images of the visual presentation 800 in both the vertical and horizontal directions relative to the physical object 150.

Figure 9A:
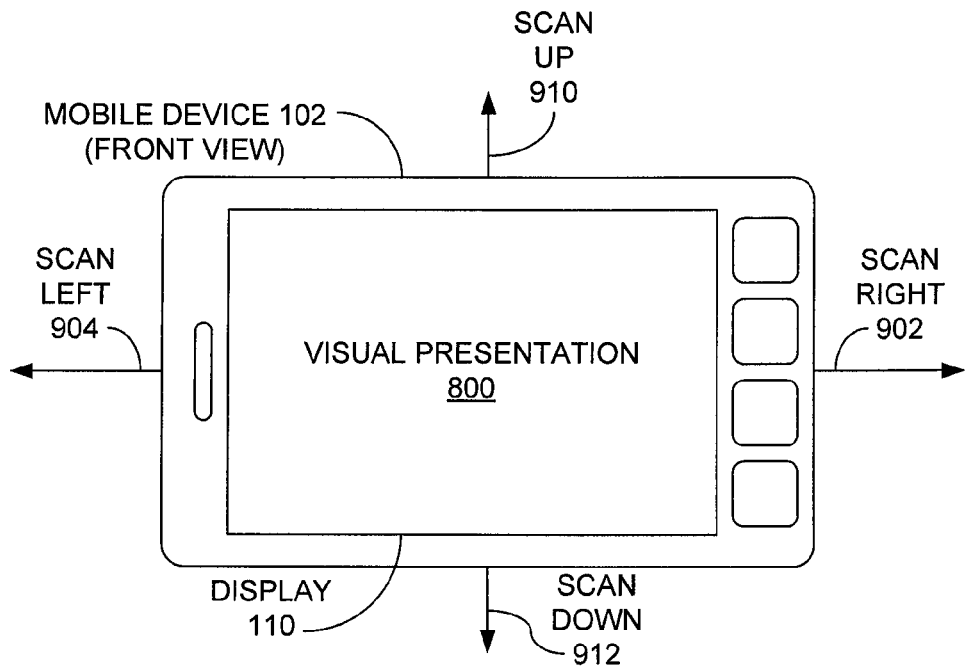
FIG. 9A is a graphical representation of example user control of scanning through multiple images of a visual presentation of an object via translation.
Figure 9B:
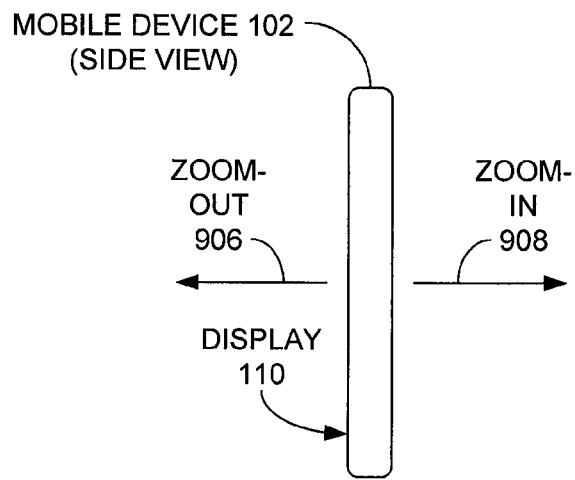
FIG. 9B is a graphical representation of example user control of altering a zoom level of an image of a visual presentation of an object via translation.

FIGS. 9A and 9B provide a front view and side view, respectively, of the mobile device 102 being manipulated by the user primarily via translation instead of rotation or tilting in order to control the visual presentation 800. As shown in FIG. 9A, moving the mobile device 102 to the left may cause the device 102 to proceed through the images of the presentation 800 as though moving to the left about the object 150 in a scan left operation 904. Oppositely, moving the mobile device 102 to the right may cause the device 102 to proceed through the images of the presentation 800 as though travelling to the right relative to the object 150 in a scan right operation 902. Accordingly, by maintaining the mobile device 102 stationary in the horizontal direction, the user may cause the mobile device 102 to maintain the current image of the visual presentation 800 on the display 110.

In a related example shown in FIG. 9A, movement of the mobile device 102 in an upward direction may cause the mobile device 102 to execute a scan up operation 910, in which images associated with upper views of the object 150 may be displayed, while downward movement of the device 102 may cause a scan down operation 912, whereby lower views of the object 150 are displayed. Further, the magnitude of the movement of the device 102, such as measured by distance, acceleration, or another metric, may be associated with faster scanning through the various images of the presentation 800 in the corresponding direction. For example, moving the device 102 quickly to the left may cause scanning through the images of the presentation 800 in an apparent leftward direction in an accelerated fashion. Also, similar to the compound movements described above in conjunction with FIGS. 8A and 8B, moving the device 102 in both the vertical and horizontal directions simultaneously may cause a corresponding scan through images of the presentation 800 relative to the physical object 150.

FIG. 9B is a graphical representation of mobile device 102 being manipulated in a forward or backward direction relative to the user to alter a zoom level of the current image of the visual presentation 800 being presented via the display 110. For example, by pulling or moving the device 102 toward the user, the user may cause the device 102 to zoom-out the image currently being displayed via a zoom out operation 906. Accordingly, pushing or moving the device 102 away from the user may cause the device 102 to zoom-in on the image being presented via a zoom-in operation 908. Holding the device 102 stationary in the forward and backward direction may thus maintain the current zoom-level of the images being displayed.

While certain scan directions or zooming operations are associated with specific tilt or translational movements of the mobile device 102 in the examples described above, these or other scan or zoom operations may be associated with different movements of the mobile device 102 in other implementations.

As a result of at least some of the embodiments discussed herein, a mobile electronic device may be employed to facilitate the capturing and/or viewing of images for an integrated visual presentation of a physical object. In one example, the visual presentations may be associated with the posting and viewing of presentations of objects to be sold or purchased via an online marketplace website via a mobile device, thus allowing users to interface with the online marketplace in a more mobile environment. However, the visual presentations, as well as the objects connected therewith, may be associated with tasks or applications other than those involved with an online marketplace in other implementations, such as social networks, personal web pages, and other computer- and communication-related environments.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Programming Interfaces (APIs)).

Electronic Apparatus and System

Example embodiments may be implemented in digital electronic circuitry, or in computer hardware, firmware, or software, or in combinations thereof. Example embodiments may be implemented using a computer program product (e.g., a computer program tangibly embodied in an information carrier in a machine-readable medium) for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communications network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on their respective computers and having a client-server relationship to each other. In embodiments deploying a programmable computing system, it will be appreciated that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set forth hardware (e.g., machine) and software architectures that may be deployed in various example embodiments.

Example Machine Architecture and Machine-Readable Medium

Figure 10:
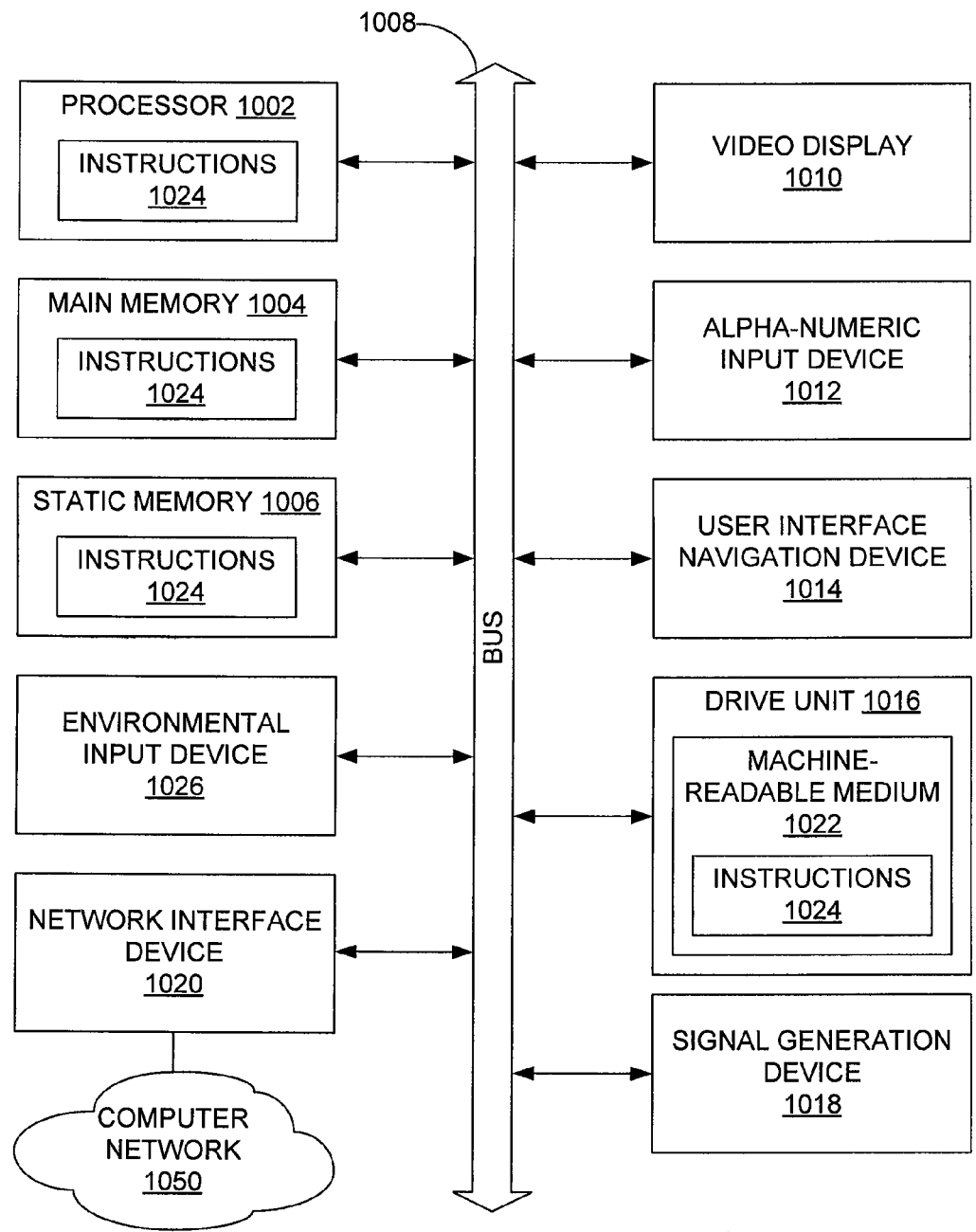
FIG. 10 is a diagrammatic representation of a machine in the example form of a computer system within which a set of instructions for causing the machine to perform any one or more of the methodologies discussed herein may be executed.

FIG. 10 is a block diagram of a machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker), and a network interface device 1020. The computer system 1000 may further include an environmental input device 1026, such as a microphone, motion detection unit (such as an accelerometer), GPS (Global Positioning System) unit, image capture unit, temperature sensing unit, and the like.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the static memory 1006, the main memory 1004, and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM (Compact Disc Read-Only Memory) and DVD-ROM (Digital Versatile Disk Read-Only Memory) disks.

Transmission Medium

The instructions 1024 may further be transmitted or received over a computer network 1050 using a transmission medium. The instructions 1024 may be transmitted using the network interface device 1020 and any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

Conclusion

Thus, a method and system to facilitate the capture and viewing of multiple-angle imagery of physical objects have been described. Although the present subject matter has been described with reference to specific example embodiments, it will be evident that various modifications and changes may be made to these embodiments without departing from the broader scope of the subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels and are not intended to impose numerical requirements on their objects.

The Abstract of the Disclosure is provided to comply with 37 C.F.R. §1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    capturing, at a mobile device, a plurality of images of a physical object from varying angles relative to the physical object in response to first user inputs from a user of the mobile device;
    analyzing, at the mobile device, the plurality of images to determine whether at least one additional image of the physical object is desirable to allow generation of a visual presentation of the physical object, the visual presentation providing a view of the physical object through a range of angles relative to the physical object;
    informing, at the mobile device, the user to initiate capturing of the at least one additional image based on the analyzing of the plurality of images, the informing of the user comprising providing an indication of at least one angle relative to the physical object for the at least one additional image;
    capturing, at the mobile device, the at least one additional image in response to at least one second user input; and
    generating the visual presentation based on the plurality of images and the at least one additional image, the visual presentation comprising at least some of the plurality of images and the at least one additional image configured to be presented in a presentation order.

2. The method of claim 1, the informing of the user further comprising providing a recommendation to the user regarding a capture setting to be applied to the mobile device to capture the at least one additional image.

3. The method of claim 2, the recommendation comprising an indication of a photographic flash setting.

4. The method of claim 1, each of the plurality of images comprising a single still image captured at the mobile device.

5. The method of claim 1, the plurality of images comprising a video segment captured at the mobile device.

6. The method of claim 1, the generating of the visual presentation comprising:
    determining that at least one of the plurality of images is of unacceptable quality; and
    selecting less than all of the plurality of images to incorporate into the visual presentation based on the determining that the at least one of the plurality of images is of unacceptable quality.

7. The method of claim 1, the generating of the visual presentation comprising generating interpolated images based on at least one of the plurality of images to incorporate into the visual presentation.

8. The method of claim 1, the generating of the visual presentation comprising:
   identifying the physical object in each of the plurality of images; and
   centering the physical object within at least one of the plurality of images based on the identifying of the physical object.

9. The method of claim 1, the generating of the visual presentation comprising:
   identifying the physical object in each of the plurality of images; and
   resizing the physical object in at least one of the plurality of images based on the identifying of the physical object.

10. The method of claim 1, the generating of the visual presentation comprising:
    identifying the physical object in each of the plurality of images; and
    editing a background area of at least one of the plurality of images, the background area being defined by an area of the at least one of the plurality of images that does not include the physical object.

11. The method of claim 1, the generating of the visual presentation comprising adjusting at least one of brightness, contrast, color, and hue of at least one of the plurality of images.

12. A device comprising:
    a user interface;
    an image capturing component;
    at least one processor; and
    at least one memory component to store instructions that, when executed by the at least one processor, cause the at least one processor to:
      capture, via the image capturing component, a plurality of images of a physical object in response to first user inputs received via the user interface from a user of the device, the user causing the plurality of images to be captured from varying angles relative to the physical object;
      store the plurality of images in the at least one memory component;
      analyze the plurality of images to determine whether at least one additional image of the physical object is desirable to allow generation of a visual presentation of the physical object, the visual presentation to provide a view of the physical object through a range of angles relative to the physical object;
      inform the user, via the user interface, to initiate capturing of the at least one additional image based on the analyzing of the plurality of images, the informing of the user comprising an indication of at least one angle relative to the physical object for the at least one additional image;
      capture the at least one additional image in response to at least one second user input received via the user interface;
      generate the visual presentation based on the plurality of images and the at least one additional image, the visual presentation comprising at least some of the plurality of images and the at least one additional image configured to be presented in a presentation order; and
      store the visual presentation in the at least one memory component.

13. The device of claim 12, the instructions causing the at least one processor to inform the user by providing a recommendation to the user regarding a capture setting to be applied to the image capturing component to capture the at least one additional image.

14. The device of claim 12, each of the plurality of images comprising a single still image.

15. The device of claim 12, the plurality of images comprising a video segment.

16. The device of claim 12, the instructions causing the at least one processor to generate the visual presentation by determining that at least one of the plurality of images is of unacceptable quality, and by selecting less than all of the plurality of images to incorporate into the visual presentation based on the determining that the at least one of the plurality of images is of unacceptable quality.

17. The device of claim 12, the instructions causing the at least one processor to generate the visual presentation by generating interpolated images based on at least one of the plurality of images to incorporate into the visual presentation.

* * * * *